United States Patent [19]

Fawkes

[11] 4,111,929
[45] Sep. 5, 1978

[54] TETRAHYDROQUINOLINE AZO TRIAZOLE DYESTUFFS

[75] Inventor: David Melville Fawkes, Manchester, England

[73] Assignee: Imperial Chemical Industries Limited, London, England

[21] Appl. No.: 702,733

[22] Filed: Jul. 6, 1976

[30] Foreign Application Priority Data

Jul. 11, 1975 [GB] United Kingdom ............... 29226/75

[51] Int. Cl.² .................. C09B 29/36; D06P 1/08; D06P 1/10; D06P 3/76
[52] U.S. Cl. .................. 260/146 R; 260/155; 260/283 R; 260/289 R; 260/308 R
[58] Field of Search .................. 260/155, 157, 146 R

[56] References Cited

U.S. PATENT DOCUMENTS

| | | | |
|---|---|---|---|
| 3,101,988 | 8/1963 | Bossard et al. | 260/158 X |
| 3,148,935 | 9/1964 | Pfitzner et al. | 260/158 X |
| 3,635,942 | 1/1972 | Mohr et al. | 260/157 |
| 3,770,716 | 11/1973 | Ozutsumi et al. | 260/146 R |

Primary Examiner—Floyd D. Higel
Attorney, Agent, or Firm—Cushman, Darby & Cushman

[57] ABSTRACT

Azo dyestuffs of the formula:

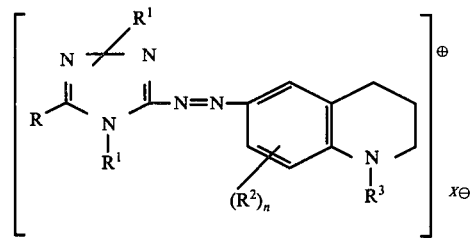

wherein R is hydrogen, methyl or phenyl, $R^1$ is methyl, ethyl or benzyl, $R^2$ is methyl, ethyl, methoxy or chloro, n is 0 or 1 and when n is 1, $R^2$ is in the 7-position of the tetrahydroquinoline ring and $R^3$ is straight chain butyl, pentyl or hexyl and X is an anion; a process for the manufacture of such dyestuffs which are useful for the coloration of synthetic polymeric materials such as polyacrylonitrile and blends thereof.

3 Claims, No Drawings

TETRAHYDROQUINOLINE AZO TRIAZOLE DYESTUFFS

This invention relates to new water-soluble azo dyestuffs to their manufacture and to the use of such dyestuffs for the colouration of synthetic polymeric materials in the form of ribbons, tapes, fibres, threads, films and textile materials generally. The dyestuffs are particularly valuable for the colouration of polymers and copolymers of acrylonitrile and dicyanoethylene and also acid-modified polyesters and polyamides.

Thus according to the present invention there are provided novel azo dyestuffs devoid of carboxylic acid and sulphonic acid groups and of the formula:

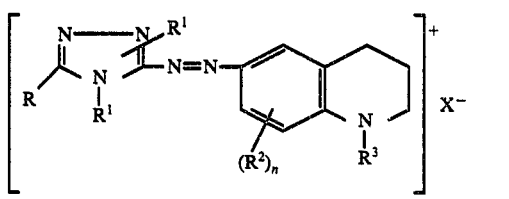

wherein R is hydrogen, alkyl, cycloalkyl, aryl, aralkyl, thienyl, alkoxycarbonyl, alkylthioether, arylthioether, aralkylthioether, alkoxy or aryloxy; $R^1$ is alkyl, hydroxyalkyl, chloroalkyl, bromoalkyl, alkenyl, cycloalkyl, aralkyl, 2-carbamoylethyl, 2-carbamoyl-2-methylethyl, lower alkoxyethyl or lower alkylcarbonylethyl; $R^2$ is a non-ionogenic substituent, n is 0, 1, 2 or 3; $R^3$ is straight chain butyl, pentyl or hexyl and X is an anion.

Azo triazole dyestuffs may exist in several tautomeric forms, which may consequently yield more than one cationic isomer upon quaternisation. Thus in the case of 1,2,4-triazoles coupled in the 3-position, quaternisation may yield a number of isomers, which may be written in different canonical forms, viz.

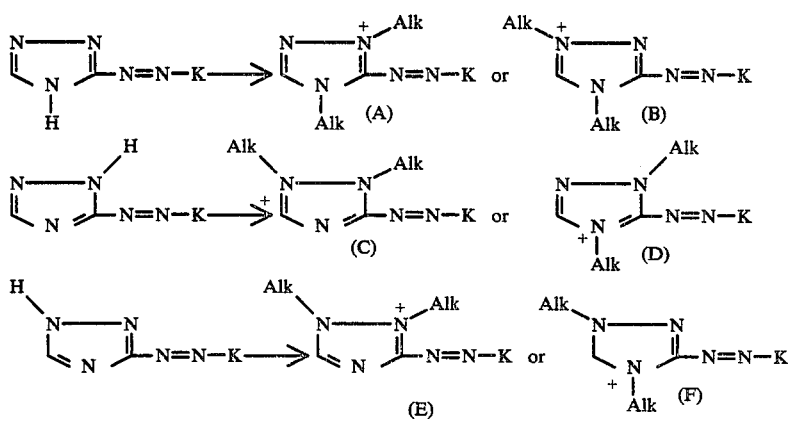

wherein K is a coupling component and Alk is a quaternising radical. It will also be obvious that in those cases where K is the residue of a para-coupling amine as in the case of the dyestuffs of the present invention, other canonical forms can be written where the positive charge is located on the nitrogen atom of the para-coupling amine. In the above, A and D, B and F, C and E are different canonical forms of three different isomers.

It is to be clearly understood that the dyestuffs of the present invention are mixtures of the pairs of canonical forms of the above three isomers, although for the sake of clarity they have been formulated in Formula I by a single formula.

Examples of R include hydrogen, methyl, ethyl, propyl, butyl, phenyl, 4-nitrophenyl, 3-tolyl, cyclohexyl, 2-thienyl, benzyl, 4-chlorophenyl, 4-methoxyphenyl, methoxycarbonyl, ethoxycarbonyl, propoxycarbonyl, butoxycarbonyl, methoxy, ethoxy, propoxy, butoxy, phenoxy, methylthio, ethylthio, propylthio, butylthio, phenylthio and benzylthio. R is preferably hydrogen, methyl or phenyl especially hydrogen.

Examples of $R^1$ include methyl, ethyl, propyl, butyl, 2-chloroethyl, 2-bromoethyl, 2-acetoxyethyl, allyl, benzyl, phenylethyl, 2-carbamoylethyl, 2-carbamoyl-2-methylethyl, methoxyethyl, methylcarbonylethyl, 2-hydroxyethyl.

Preferably $R^1$ is methyl, ethyl or benzyl.

$R^2$ is a non-ionogenic substituent and there may be none, one, two or three of such substituents present in the dyestuff according as to whether n is 0, 1, 2 or 3. If more than one substituent $R^2$ is present they need not be the same substituent.

Examples of non-ionogenic substituents include halogens such as chlorine and bromine, lower alkyl such as methyl, ethyl, propyl and butyl, alkoxy such as methoxy, ethoxy, propoxy and butoxy, nitro, carboxylic acid ester such as methoxycarbonyl, ethoxycarbonyl, acyl such as methyl and ethylcarbonyl and methyl-, ethyl- and phenylsulphonyl, cyano, trifluoromethyl, thiocyano, acylamino such as formamido, acetylamino and propionylamino, phenylsulphonylamino, methyl and ethylsulphonylamino, sulphonamido, alkylsulphonamido such as monomethyl, monoethyl, dimethyl- and diethylsulphonamido, carbonamido and alkylcarbonamido such as methyl-, ethyl- and dimethyl- and diethylcarbonamido, aryl acid amides such as phenylcarbonamido and phenylsulphonamido and ureido.

$R^2$ is preferably methyl, ethyl, methoxy, ethoxy or chloro and n is preferably 0 or 1.

$R^3$ is butyl, pentyl or hexyl and is a straight chain group.

Examples of the anion X include inorganic anions such as chloride, bromide, iodide, tetrachlorozincate, bisulphate, nitrate, sulphate, sulphamate, phosphate or borate, tetrafluoroborate and organic anions such as acetate, propionate, methosulphate, ethosulphate, and p-tolyl sulphonate. In those cases where the anion is polyvalent the dyestuffs will contain a corresponding molar proportion of the cationic part of the dyestuff.

One particularly preferred class of dyestuffs of the invention is that of the formula:

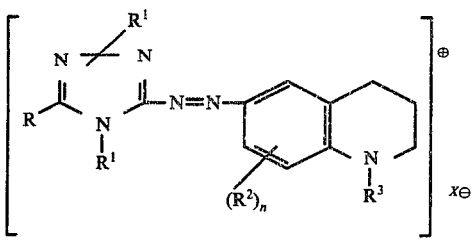

wherein R is hydrogen, methyl or phenyl particularly hydrogen, $R^1$ is methyl, $R^2$ is methyl, ethyl, methoxy or chloro, n is 0 or 1 and when n is 1, $R^2$ is in the 7-position of the tetrahydroquinoline ring and $R^3$ and X are as hereinbefore defined.

As a further feature of the present invention there is provided a process for the manufacture of the dyestuffs of the invention which comprises alkylating a compound of the formula

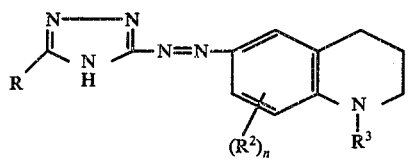

(II)

wherein R, $R^2$, $R^3$ and n are as hereinbefore defined.

As examples of alkylating agents there may be mentioned alkyl halides such as methyl, ethyl, propyl and butyl chlorides and the corresponding bromides, alkenyl halides such as allyl chloride or bromide, aralkyl halides such as benzyl chloride or bromide, dialkyl sulphates such as dimethyl sulphate, diethyl sulphate, dipropyl sulphate and dibutyl sulphate, alkyl esters of aryl sulphonates such as methyl and ethyl p-toluene sulphonate and other lower alkyl esters of strong mineral acids or organic sulphonates. Other alkylating agents may themselves carry substituents as, for example, in chloropropionitrile, bromopropionamide and bromohydrin.

The reaction between the alkylating/quaternising agent and the compound of formula II may be carried out neat without addition of other solvents, or again may be carried out in an inert organic solvent such as benzene, toluene, xylene, chlorobenzene, nitrobenzene, acetone, carbon tetrachloride, tetrachloroethane, perchloroethylene, chloroform, dimethylformamide, acetonitrile, acetic acid, formic acid or 2-ethoxyethanol. The alkylation may also be effected in aqueous phase optionally in the presence of an organic solvent. The alkylating agent may be used in considerable excess, for example up to 6 moles for each mole of dyestuff. Suitable temperatures are from 20° C. to 150° C. and particularly 20°-90° C. The inclusion of an acid binding agent of often beneficial. Such agents include magnesium oxide, sodium and potassium carbonate, sodium and potassium bicarbonate, magnesium and calcium carbonate, potassium acetate or mixtures of such agents.

Alkylation of compounds of formula (II) may also be carried out by reaction with, for example, acrylamide in an organic or mineral acid such as acetic, formic or hydrochloric acid or mixtures of these at between 50° and 100° C.

Alkylation may also be carried out by reacting a compound of formula (II) with ethylene oxide or its derivatives of formula:

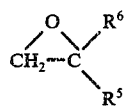

wherein $R^5$ and $R^6$ represent hydrogen or an optionally substituted lower alkyl group.

This reaction is carried out in a solvent in the presence of a mineral or organic acid which provides the anion X, at temperatures of 10° to 100° C. and preferably 40°-90° C. Suitable acids include sulphuric, hydrochloric, hydrobromic, phosphoric, benzenesulphonic, toluenesulponic, formic, acetic or propionic. Such acids may also serve as solvent or may be used in admixture with each other or with other organic solvents such as dimethylformamide, acetonitrile, dioxan, tetrahydrofuran, chlorobenzene, toluene, xylene, nitrobenzene, acetone or methylethylketone.

When the reaction is effected in hydrophobic organic solvents with alkylated dyestuff is normally insoluble and may be isolated by filtration. If desired, the alkylated dyestuff may be isolated from aqueous solution by precipitation in the form of a salt such as tetrachlorozincate obtained by adding zinc chloride to the aqueous solution.

As a result of the alkylation the dyestuff may be obtained for example in the form of the chloride, bromide or methosulphate according to the alkylating agent used. If the dyestuff is required as the salt of a different anion, then one anion may be replaced by another by known methods of metathesis.

Insoluble azo dyestuffs useful as starting materials for the above process may be made by diazotising a 3-aminotriazole followed by coupling of the diazo compound with a suitable tetrahydroquinoline derivative.

Examples of aminotriazoles which may be used as diazo components include:
3-amino-1,2,4-triazole
3-amino-5-methyl-1,2,4-triazole
3-amino-5-ethyl-1,2,4-triazole
3-amino-5-propyl-1,2,4-triazole
3-amino-5-butyl-1,2,4-triazole
3-amino-5-phenyl-1,2,4-triazole
3-amino-5-(p-nitrophenyl)-1,2,4-triazole
3-amino-5-(m-tolyl)-1,2,4-triazole
3-amino-5-cyclohexyl-1,2,4-triazole
3-amino-5-(2-thienyl)-1,2,4-triazole
3-amino-5-benzyl-1,2,4-triazole
3-amino-5-(p-chlorophenyl)-1,2,4-triazole
3-amino-5-(p-methoxyphenyl)-1,2,4-triazole
3-amino-5-methylthio-1,2,4-triazole
3-amino-5-ethylthio-1,2,4-triazole
3-amino-5-propylthio-1,2,4-triazole
3-amino-5-butylthio-1,2,4-triazole
3-amino-5-benzylthio-1,2,4-triazole
3-amino-5-phenylthio-1,2,4-triazole
3-amino-5-methoxy-1,2,4-triazole
3-amino-5-ethoxy-1,2,4-triazole
3-amino-5-propoxy-1,2,4-triazole
3-amino-5-butoxy-1,2,4-triazole
3-amino-5-phenoxy-1,2,4-triazole
3-amino-5-methoxycarbonyl-1,2,4-triazole (+ higher ester homologues).

Examples of tetrahydroquinolines which may be used as coupling components include the following where THQ represents tetrahydroquinoline:

N-n-butyl THQ
N-n-pentyl THQ
N-n-hexyl THQ

There may also be used as coupling components analogues of the above-listed compounds in which one, two or three non-ionogenic substituents such as methyl, ethyl, methoxy, ethoxy or chloro substituents are present in the non-heterocyclic ring of the tetrahydroquinoline, one being preferably in the 7-position of the tetrahydroquinoline nucleus.

Insoluble azo dyestuffs suitable as starting materials may also be prepared by other routes, for example condensation of a 6-nitrosotetrahydroquinoline compound with an aminotriazole or by the oxidative coupling of a triazole hydrazone with the tetrahydroquinoline.

They may also be prepared by diazotisation and coupling of, for example, 3-amino-5-carboxytriazoles followed by decarboxylation.

Diazotisation of an aminotriazole followed by coupling is the preferred method.

The dyestuffs of the present invention may be used to colour synthetic polymeric materials by application from an aqueous bath. The present dyestuffs give valuable bright shades of high tinctorial strength.

In particular the dyestuffs of the invention are valuable for dyeing polyacrylonitrile materials and blends thereof and may be applied to polyacrylonitrile materials from acid, neutral or slightly alkaline dyebaths (i.e. pH from 3-8) at temperatures between 40°-120° C. and preferably between 80°-120° C. or by printing techniques using thickened print pastes. Bluish-red to red-violet dyeings of excellent fastness properties to washing, perspiration, and steam-pleating and light are obtained.

The invention is illustrated but not limited by the following Examples in which all parts and percentages are by weight unless otherwise stated. When parts by volume are given, the relation of weight to volume is the relation of gram to milliliter.

EXAMPLE 1

0.84 Parts 3-amino-1,2,4-triazole is dissolved in 4 parts water and 1.1 parts by volume concentrated sulphuric acid. 4 parts by volume glacial acetic acid is added, and the amine solution cooled below 5° C. Diazotisation is effected by addition of 2.1 parts by volume 5N sodium nitrite solution, dropwise with stirring at 0°-5° C. The diazo solution is stirred at 0°-5° C. for a further 2 hours.

1.89 parts N-n-butyl tetrahydroquinoline is dissolved in 150 parts water and 10 parts concentrated hydrochloric acid. 1 part urea is added, and the coupling bath cooled below 5° C. The above diazo solution is added slowly with stirring at <5° C. and stirred for a further 15 minutes before adding sodium acetate to neutralise the acidity to Congo Red paper. The resultant dyebase is filtered, washed with water and dried to give 2.5 parts yellow disperse dye.

1.87 Parts of the above dyebase is dissolved in 30 parts glacial acetic acid containing 0.7 parts magnesium oxide. 5.0 parts dimethyl sulphate is added dropwise with stirring at 60° C., and alkylation continued at 80°-85° C. for a further 3 hours. The reactants are then cooled, drowned into 200 parts water, 1 part "hyflo" Supercel is added and the cationic dyestuff solution screened through a bed of "hyflo" Supercel. The cationic dyestuff is isolated by addition of 3 parts by volume 100% ZnCl₂ solution and salting to 10%. 1.8 parts dyestuff of formula

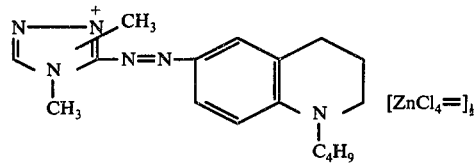

is obtained which dyed polyacrylonitrile fibres from a weakly acid dyebath in bright red-violet shades having excellent light fastness and wet fastness properties.

EXAMPLE 2

0.84 Parts 3-amino-1,2,4-triazole is diazotised as described in the above Example 1. 2.03 parts N-n-bentyl tetrahydroquinoline is dissolved in 100 parts acetone and 50 parts water. 1 part urea is added, and the coupling bath cooled <5° C. The above diazo solution is added slowly with stirring at 0°-5° C., stirred for 15 minutes and the acidity to Congo Red paper neutralised by addition of sodium acetate. After stirring at 0°-5° C. for a further 30 minutes, the coupling bath is diluted by addition of 200 parts water, and the dyebase filtered and dried. 2.45 Parts yellow disperse dyestuff are obtained.

1.97 Parts of the above dyebase are dissolved in 30 parts glacial acetic acid containing 0.7 parts magnesium oxide. 5.0 parts dimethyl sulphate are added dropwise with stirring at 60° C. After stirring for a further 2 hours at 75°-80° C., all the disperse dyebase is converted to cationic dyestuff. The reactants are then cooled, 1 part "hyflo" Supercel added and the dyestuff solution screened through a bed of "hyflo" Supercel. The cationic dyestuff is isolated by adding 3 parts by volume 100% ZnCl₂ solution and salting to 20%. 1.5 parts dyestuff are obtained of structure

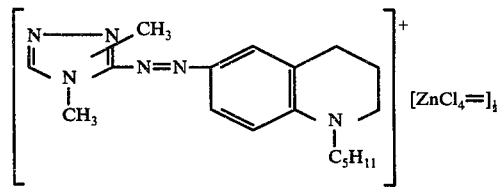

It dyes polyacrylonitrile fibers in bright red-violet shades with excellent all-round fastness properties including fastness to light.

If the above N-pentyl tetrahydroquinoline is replaced by the appropriate amount of the coupling components listed in column 2 of the following table, and proceeding in the manner described in the above example, similar dyestuffs are obtained whose shade on polyacrylonitrile fibres is given in column 3 of the table:

| Example | Coupling Component | Shade on Polyacrylonitrile |
|---|---|---|
| 3 | N-hexyl THQ | Red-violet |
| 4 | 7-methyl-N-butyl THQ | Bluish-red |
| 5 | 7-methyl N-pentyl THQ | " |
| 6 | 7-methyl N-hexyl THQ | " |
| 7 | 7-methoxy N-butyl THQ | " |
| 8 | 7-ethyl N-butyl THQ | " |

| Example | Coupling Component | Shade on Polyacrylonitrile |
|---|---|---|
| 9 | 7-chloro N-butyl THQ | Red-violet |

Similar dyestuffs are obtained by replacing the 3-amino-1,2,4-triazole in any of Examples 1 to 9 by 3-amino-5-methyl-1,2,4-triazole or 3-amino-5-phenyl-1,2,4-triazole.

We claim:

1. An azo dyestuff of the formula:

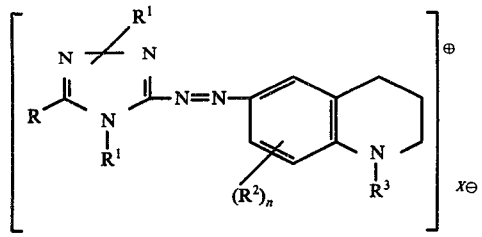

wherein R is hydrogen, methyl or phenyl, $R^1$ is methyl, ethyl or benzyl, $R^2$ is methyl, ethyl, methoxy or chloro, $n$ is 0 or 1 and when $n$ is 1, $R^2$ is in the 7- position of the tetrahydroquinoline ring and $R^3$ is straight chain butyl, pentyl or hexyl and X is an anion.

2. Azo dyestuffs as claimed in claim 1 wherein R is hydrogen.

3. Azo dyestuffs as claimed in claim 1 wherein $R^1$ is methyl.

* * * * *